(12) United States Patent
Huang

(10) Patent No.: US 12,639,109 B2
(45) Date of Patent: May 26, 2026

(54) JOB PROCESSING SYSTEM AND METHOD BASED ON CLOUD SERVICE

(71) Applicant: WISTRON CORP., New Taipei City (TW)

(72) Inventor: Shyh Ming Huang, New Taipei City (TW)

(73) Assignee: WISTRON CORP., New Taipei City (TW)

( * ) Notice: Subject to any disclaimer, the term of this patent is extended or adjusted under 35 U.S.C. 154(b) by 513 days.

(21) Appl. No.: 18/311,265

(22) Filed: May 3, 2023

(65) Prior Publication Data

US 2024/0272938 A1      Aug. 15, 2024

(30) Foreign Application Priority Data

Feb. 15, 2023    (TW) .................................. 112105284

(51) Int. Cl.
*G06F 9/48* (2006.01)
*G06F 9/52* (2006.01)

(52) U.S. Cl.
CPC .............. *G06F 9/4881* (2013.01); *G06F 9/52* (2013.01)

(58) Field of Classification Search
None
See application file for complete search history.

(56) References Cited

U.S. PATENT DOCUMENTS

| | | | | |
|---|---|---|---|---|
| 8,375,390 | B2 * | 2/2013 | Inoue ...................... | G06F 9/461 |
| | | | | 718/102 |
| 9,122,535 | B2 * | 9/2015 | Soundararajan ...... | G06F 9/5066 |
| 9,250,953 | B2 * | 2/2016 | Kipp ..................... | G06F 9/5027 |
| 9,372,735 | B2 * | 6/2016 | Calder .................. | G06F 9/5077 |
| 9,965,322 | B2 * | 5/2018 | Woo ...................... | G06F 9/5044 |
| 10,565,011 | B2 * | 2/2020 | Sevigny ............... | G06F 9/5044 |
| 2013/0132967 | A1 * | 5/2013 | Soundararajan ...... | G06F 16/172 |
| | | | | 709/201 |
| 2013/0179894 | A1 * | 7/2013 | Calder .................. | G06F 9/5027 |
| | | | | 718/104 |
| 2013/0268937 | A1 * | 10/2013 | Woo ...................... | G06F 9/5044 |
| | | | | 718/102 |
| 2015/0304399 | A1 | 10/2015 | Kramer | |

OTHER PUBLICATIONS

TW Office Action dated Sep. 14, 2023 in Taiwan application No. 112105284.

* cited by examiner

*Primary Examiner* — Van H Nguyen

(74) *Attorney, Agent, or Firm* — McClure, Qualey & Rodack, LLP

(57) ABSTRACT

A job processing method based on a cloud service includes: receiving a job request and obtaining an identification string of the job according to the job request by a job scheduler, sending the identification string to a memory cache and generating a worker by the job scheduler, obtains the identification string from the memory cache and obtaining data from a database according to the identification string by the worker, and executing the job based on the data and sending a result of the job to the database by the worker.

13 Claims, 3 Drawing Sheets

JOB PROCESSING SYSTEM AND METHOD BASED ON CLOUD SERVICE

CROSS-REFERENCE TO RELATED APPLICATIONS

This non-provisional application claims priority under 35 U.S.C. § 119(a) on Patent Application No(s). 112105284 filed in Taiwan, R.O.C. on Feb. 15, 2023, the entire contents of which are hereby incorporated by reference.

BACKGROUND

1. Technical Field

The present disclosure relates to cloud services and high-concurrency computing architecture, and more particular to a job processing system and method based on cloud services.

2. Related Art

Existing cloud services, such as Amazon Web Services (AWS), Microsoft's cloud service platform (Microsoft Azure), Google Cloud Platform (GCP), and the Cloud Native Computing Foundation's Kubernetes (K8s), are widely used in various information systems, such as booking systems.

Because these cloud services adopt server automatic scaling systems, when performing multiple computing tasks, they can automatically add multiple servers to receive a large number of requests, reducing the overall service time. In addition, the system can also reduce the number of servers after completing the computing tasks, reducing hardware costs and power consumption.

However, when the conventional horizontal scaling service architecture is applied to high-load computing tasks, bottlenecks may occur. In this architecture, the client device distributes the computing tasks to the existing workers (also known as task servers, pods or virtual hosts) through the load balancer, and the worker notifies the metric server of its own metrics, such as CPU utilization, memory percentage, disk quota, etc. The autoscaler determines whether to add new workers (performing horizontal scaling) based on the metrics in the metric server. However, before new workers are added, multiple time-consuming tasks have already entered the existing servers and are waiting. Even if it is known that the worker is already overwhelmed, in the existing architecture, this worker still needs to complete all the tasks.

In summary, the drawback of the conventional horizontal scaling service architecture is that the autoscaler cannot directly obtain relevant information about job requests from the client device, and can only determine whether to expand based on the operational status of the existing workers. As a result, it is easy to have multiple tasks stuck in one worker, making it impossible to achieve parallel processing of a large number of tasks and thus increasing the overall execution time.

SUMMARY

According to one embodiment of the present disclosure, a job processing method based on a cloud service includes: receiving a job request and obtaining an identification string (JOB ID) of a job according to the job request by a job scheduler; sending the identification string to a memory cache and spawning a worker by the job scheduler; obtaining the identification string from the memory cache and obtaining job data from a database according to the identification string by the worker; and executing the job according to the job data and sending a result of the job to the database by the worker.

According to one embodiment of the present disclosure, a job processing system based on a cloud service includes a memory cache, a database, and a job scheduler. The memory cache is configured to store an identification string associated with a job. The database is configured to store the identification string associated with the job and job data associated with the job. The job scheduler is communicably connected to the database, wherein the job scheduler is configured to receive a job request, obtain the identification string of the job according to the job request, send the identification string to the memory cache, and spawn a worker according to the job request. The worker is communicably connected to the database and the memory cache, the worker is configured to obtain the identification string from the memory cache, obtain the job data from the database according to the identification string, execute the job according to the job data, and send the result of the job to the database.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
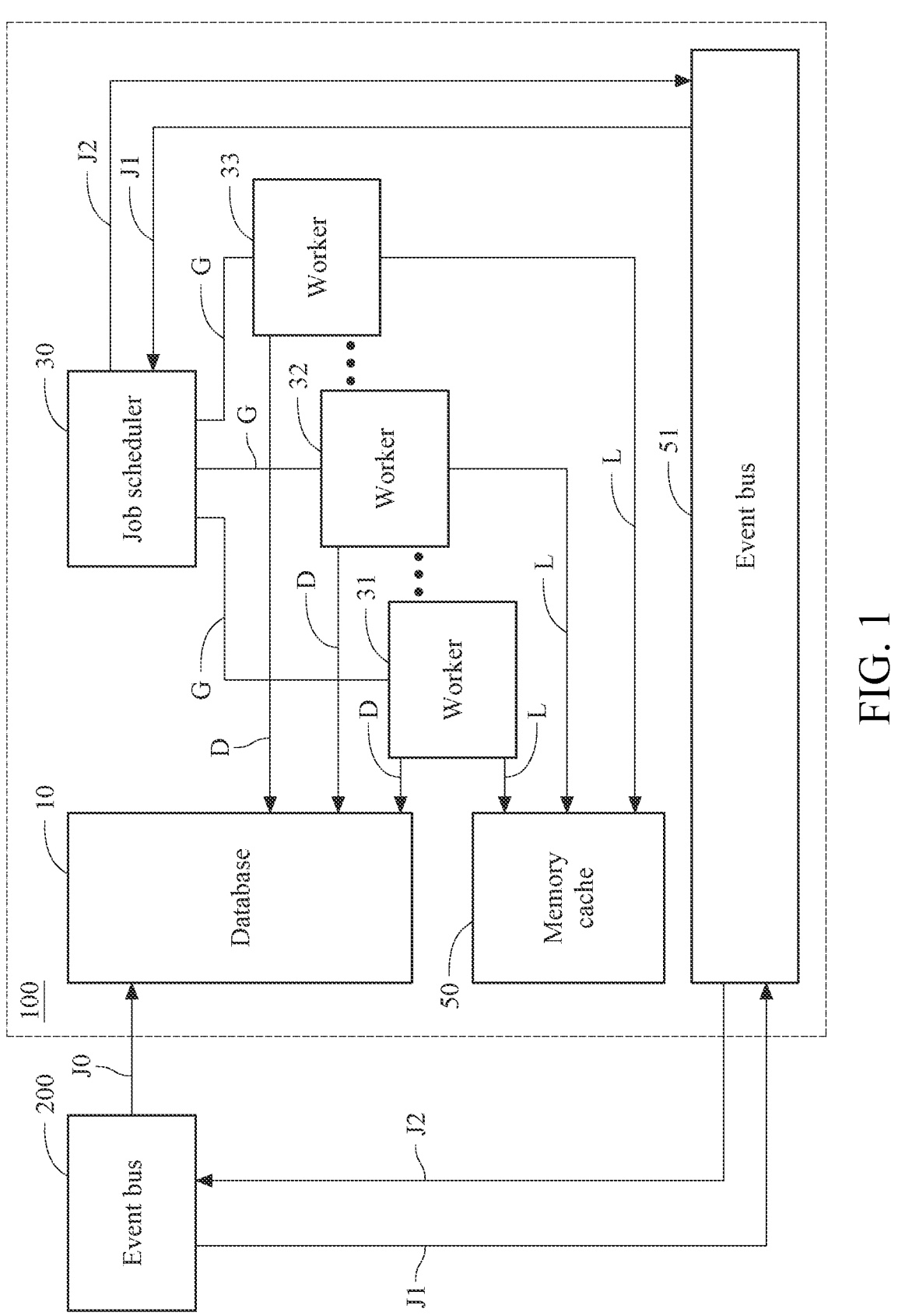
FIG. 1 is a functional block diagram of a job processing system based on a cloud service according to an embodiment of the present disclosure.

FIG. 1 is a functional block diagram of a job processing system based on a cloud service according to an embodiment of the present disclosure. The job processing system 100 based on the cloud service communicably connects to a client device for receiving jobs. The client device 200 provides a plurality of jobs. Each job includes a job request and job data. The job processing system 100 based on the cloud service is configured to process these jobs and notify the client device 200 the results. The client device 200 may adopt one of the following examples: a personal computer, a portable device such as a smartphone or a tablet computer, and a server. However, the present disclosure is not limited to the above examples.

As shown in FIG. 1, the job processing system 100 based on the cloud service according to an embodiment of the present disclosure includes a database 10, a job scheduler 30, workers 31, 32 and 33 (in the following, each worker is labeled as worker 31), a memory cache 50 and an event bus 51. In an embodiment, all workers have the same hardware configuration.

The database 10 is configured to store a job table and a worker table. Please refer to table 1 and table 2 below. In an embodiment, the database 10 is, for example, a physical server. In another embodiment, the database 10 is, for example, a cloud server.

TABLE 1 an example of the job table.

| Identification string | Job name | Job data | Response data | Success indicator |
|---|---|---|---|---|
| 1 | Calculate X price | . . . | . . . | True |
| 2 | Calculate Y price | . . . | . . . | True |
| 3 | . . . | . . . | . . . | . . . |
| 4 | Calculate Z price | . . . | . . . | False |

Table 1 is an example of the job table. In Table 1, the identification string (JOB ID) is a sequentially increasing number used to identify the job. One identification string corresponds to one job. In an embodiment, an identification string is automatically generated when the job data is written to the database 10 (as shown in J0 in FIG. 1). In other words, the identification string is generated by the database 10 itself. After the client device 200 writes the job data to the database 10, the database 10 will generate an identification string. In another embodiment, when the job scheduler 30 receives a job request, it generates an identification string. When the job data is written (as shown in J0), the job scheduler 30 writes the corresponding identification string of this job data to the database 10. The job name represents what this job needs to process, such as the price calculation given in Table 1. The job data represents the input required to execute this job. The response data is the output after executing this job. The success indicator reflects whether the result of the job is successful. The job name and job data are written by client device 200 (as shown in J0). The response data and success indicators are written by the worker 31.

TABLE 2 an example of the worker table.

| Worker ID | Processed JOB ID | Start time | End time | Log | Job finish indicator |
|---|---|---|---|---|---|
| 1 | 1 | 2022 Sep. 16 08:23:22 | 2022 Sep. 16 11:23:22 | Read data | False |
| 2 | 4 | 2022 Sep. 16 09:23:32 | 2022 Sep. 16 12:24:11 | Calcula-tion | False |
| 3 | . . . | . . . | . . . | . . . | . . . |
| 4 | 6 | 2022 Sep. 16 10:05:21 | 2022 Sep. 16 11:23:22 | Write data | True |

Table 2 is an example of the worker table. Table 2 shows all the jobs that workers are currently processing and their progress. The worker ID is a sequentially increasing number used to identify each worker 31. In an embodiment, whenever the job scheduler 30 spawns a worker 31 (as shown by "G" in FIG. 1) and the worker 31 receives a job, the worker ID will increase by 1. The worker ID is generated by the database 10 and each worker 31 has a unique worker ID. The start time is the time when the job starts to be processed, while the end time is the time when the processing of the job is finished. The log represents the current progress of the job, while the job finish indicator indicates whether the job has been completed.

TABLE 3 an example of the global configuration table.

| Parameter | Value | Description |
|---|---|---|
| Number of workers | 10 | The maximum number of the worker |
| Total retry counts | 3 | The upper limit of recalculation times for worker failures |
| Recycle time in minutes | 240 | The upper limit of worker execution time |
| Number of CPU cores | 2 | Number of CPU cores of a worker |
| Memory size | 8 | Memory size of a worker, unit: GB |
| Disk size | 512 | Disk size of a worker, unit: MB |

Figure 3:
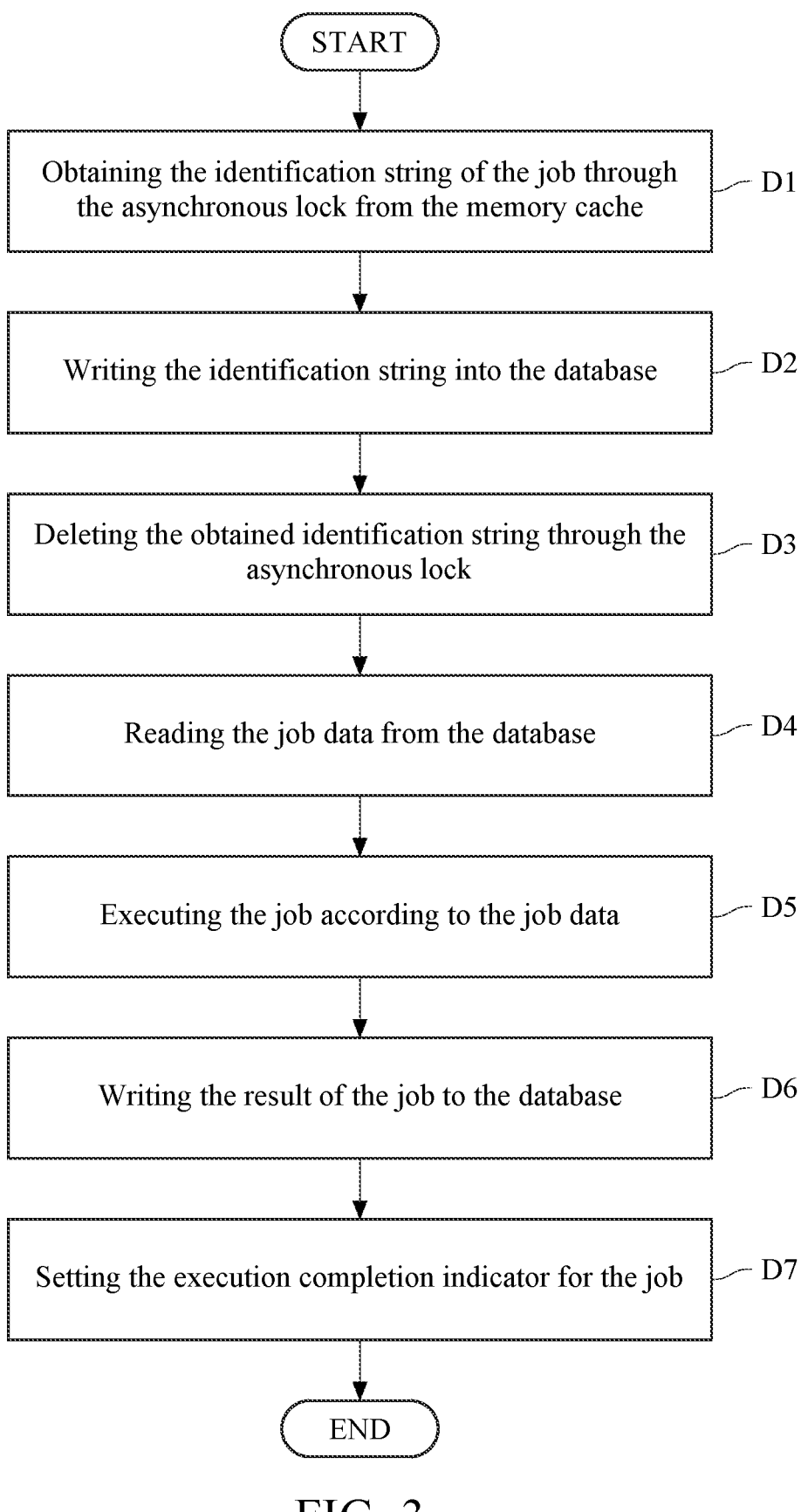
FIG. 3 is a flowchart of the operation of the worker according to an embodiment of the present disclosure.

FIG. 3 is an example of the global configuration table. The job scheduler 30 according to an embodiment of the present disclosure determines whether to spawn new workers according to the number of new job requests and the upper limit of the number of the workers. The values shown in FIG. 3 are just examples, and are not used to limit the job processing system 100 based on the cloud service proposed by the present disclosure.

The memory cache 50 is used to store the identification string (or candidate string) for multiple jobs, from which a worker selects one as the identification string. In addition, the memory cache 50 uses an asynchronous lock mechanism to read and delete the identification string. Specifically, to avoid multiple workers obtaining the same identification string of a job, which would result in the job being executed repeatedly, the worker 31 that first obtains the identification string (assuming it is X) may lock the identification string X through asynchronous lock to prevent other workers 31 from obtaining it again. Moreover, after the worker 31 writes the identification string X to the worker table, the identification string X in the memory cache 50 is deleted through the asynchronous lock. The L in FIG. 1 represents the operations of workers 31, 32, 33 obtaining or releasing the asynchronous lock. In an embodiment, the memory cache 50 can use Redis, an open-source, network-supporting, memory-based, distributed, and optionally persistent key-value pair storage database suitable for storing identification strings of multiple jobs. In other embodiments, the memory cache 50 may use memcached or AWS MemoryDB. As for the hardware implementation of the memory cache 50, it may be a physical server or cloud server running the memory cache software. In an embodiment, the asynchronous lock uses the technology of Redis lock (Redlock) distributed lock. In another embodiment, the asynchronous lock uses the technology of memcached lock or other technology that may prevent race conditions.

The event bus 51 is communicably connected to the client device 200 and the job scheduler 30. The event bus 51 provides the client device 200 with the ability to publish job request events (such as J1) and subscribe to job response events (such as J2) asynchronously. Through the publish and subscribe mechanism of the event bus 51, the requirement of waiting for a long time may be achieved. In an embodiment, the event bus 51 may use RedisEventBus or GCP's event-driven message push (Cloud Pub/Sub). In other embodiments, the event bus 51 may be omitted in the job processing system 100 based on the cloud service, and the client device 200 is communicably connected to the job scheduler 30.

Figure 2:
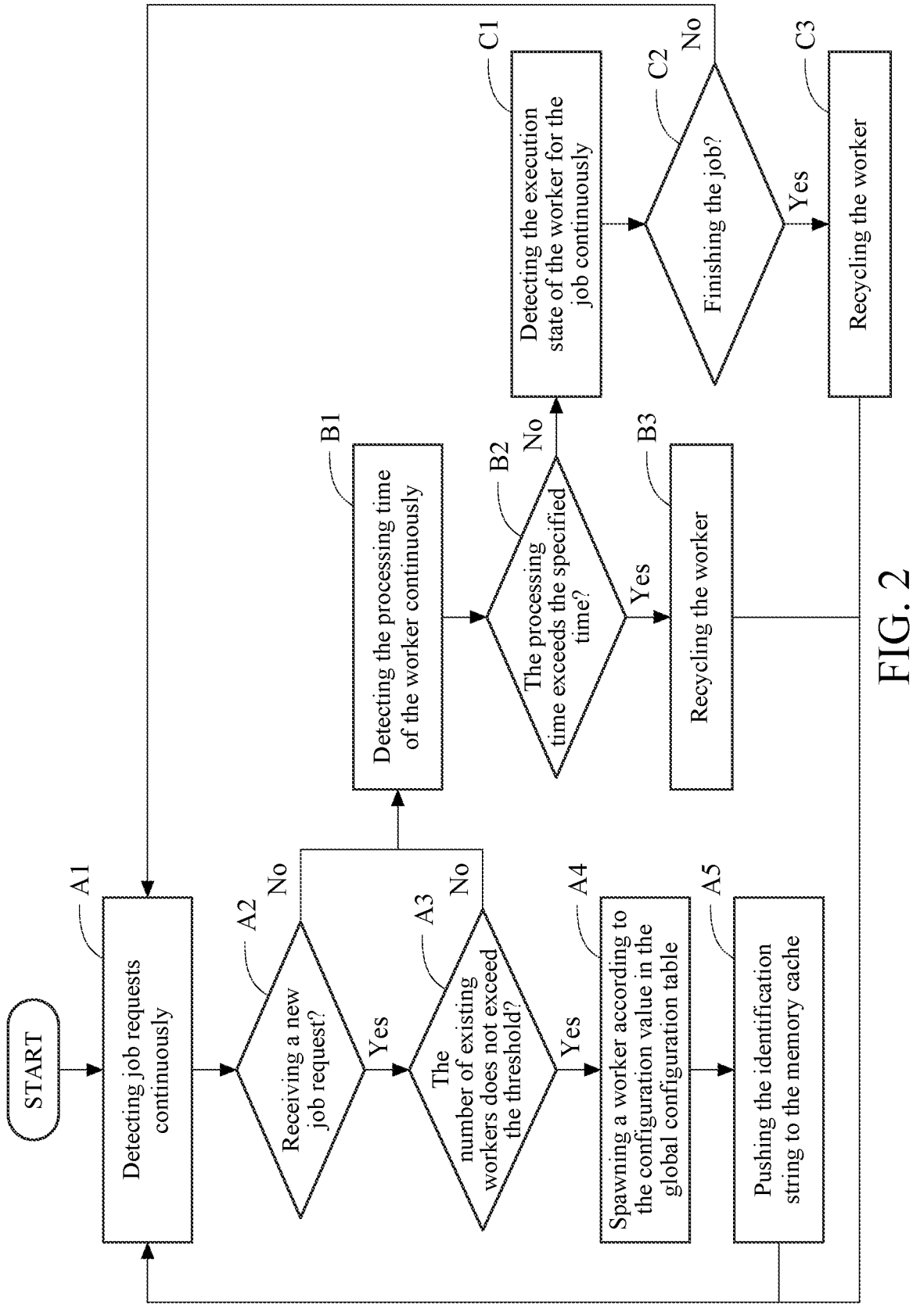
FIG. 2 is a flowchart of a job processing method based on a cloud service according to an embodiment of the present disclosure.

FIG. 2 is a flowchart of a job processing method based on a cloud service according to an embodiment of the present disclosure, and includes steps A1 to A5, B1 to B3, and C1 to C3. In other embodiments, the method may adaptively omit steps B1 to B3 or omit steps C1 to C3.

In step A1, the job scheduler 30 continuously detects job requests. In step A2, it is determined whether a new job request has been received. If the determination in step A2 is yes, step A3 is executed. If the determination in step A2 is no, step B1 is executed. In an embodiment, the job scheduler 30 subscribes to job response events via the event bus 51. When a job request is issued by the client device 200, the job scheduler 30 may receive a push notification of the new job request. In other words, the process from step A1 to the yes determination in step A2 is equivalent to the job scheduler 30 receiving a job request. Additionally, when data is written to the database 10 by the client device 200, a job identification string is generated by the database 10 itself. An embodiment of the job scheduler 30 receiving a job request is that the event bus 51 of the memory cache 50 receives the job request from the client device 200, and the job scheduler 30 continuously detects the event bus 51, and receives the job request when event bus 51 has one.

In step A3, the job scheduler 30 determines whether the number of existing workers does not exceed the threshold. If the determination in step A3 is yes, step A4 is performed. If the determination in step A3 is no, step B1 is performed.

In step A4, a worker 31 (as shown by G in FIG. 1) is spawned according to the configuration value in the global configuration table. The specific configuration items may be placed in the global configuration table as shown in Table 3. Based on the example in Table 3, if the maximum number of workers is 10 and there are currently 6 existing workers, up to four new workers may be spawned based on four new job requests.

In step A5, the job scheduler 30 pushes the identification string to the memory cache 50. In an embodiment, Redis or memcached has instructions for pushing and popping data. The job scheduler 30 may use a library to send the instructions.

In step B1 and step B2, the job scheduler 30 continuously detects processing time of the worker 31 for the job. If the determination of step B2 is yes, step B3 is performed. In other words, if the processing time exceeds the specified time, the job scheduler 30 will recycle the worker 31. If the determination of step B2 is no, step C1 is performed. Steps B1 to B3 may prevent the worker 31 from entering an endless waiting state.

In step C1 and step C2, the job scheduler 30 detects whether the worker 31 has finished the job. Specifically, the job scheduler 30 determines based on the following two conditions. First, the end time column in the worker table has a value. Second, the job finish indicator is set to true. If both of these conditions are met, the determination of step C2 is yes, and the job scheduler 30 recycles the worker 31 in step C3. If at least one of the above two conditions is not met, the determination of step C2 is no, which means the job is not finished. In this case, the job scheduler 30 returns to step A1 to detect whether there are new job requests. Steps C1 to C3 are used to recycle workers 31 who have completed their jobs.

FIG. 3 is a flowchart of the operation of the worker according to an embodiment of the present disclosure. This process is suitable for every worker 31 spawned by the job scheduler 30.

In step D1, as the identification string was stored in the memory cache 50 by the job scheduler 30 in step A5, the worker 31 may obtain the identification string of the job through the asynchronous lock from the memory cache 50

(as shown in L in FIG. 1). The asynchronous lock ensures that the same identification string of a job can only be obtained by one worker 31, which helps to improve the job parallelism.

In step D2 and step D3, the worker 31 writes the identification string into the worker table of the database 10. After deleting the obtained identification string from the memory cache 50 through the asynchronous lock (as shown in L in FIG. 1), the asynchronous lock is released to prevent other workers from executing the same job. In other words, obtaining and deleting the identification string are performed between obtaining the asynchronous lock (step D1) and releasing the asynchronous lock (step D3). During this time interval, the identification string is protected from being used by other workers (such as 32 or 33).

In step D4 and step D5, the worker 31 reads the job data (as shown by the arrow D in FIG. 1) from the job table of the database 10 according to the identification string, and then starts to execute the job according to the job data. In step D5, the worker 31 also writes the start time of the job execution into the worker table of the database 10.

In step D6 and step D7, after generating the result of the job, the worker 31 writes the result of the job to the database 10 and sets the indicator for the job to be completed. In these two steps, the worker 31 writes the response data and success indicator to the job table of the database 10, writes the end time, logs, and execution completion indicator to the worker table of the database 10. After step D7 is completed, the client device 200 may read the result of the job from the database 10. In an embodiment, after generating the result of the job, the worker 31 writes the result to the database 10, the job scheduler 30 uses the event bus 51 to send the execution complete signal and the identification string to the client device 200, and the client device 200 reads the result of the job from the database 10 according to the identification string.

Overall, the job processing system based on the cloud service proposed in an embodiment of the present disclosure uses the job scheduler to manage the lifecycle of workers according to the global configuration settings, to ensure the generation of workers, execution of job requests, writing of results, and recycling of workers. Additionally, through the interaction between the job scheduler and the workers, a highly concurrent computing architecture can be achieved, and through dynamic configuration of global settings, variations in hardware resource utilization can be satisfied.

In view of the above, the present disclosure proposes a job processing system and method based on the cloud service, which parallelizes multiple workers directly according to the number of job requests without relying on metrics. Each worker is responsible for only one job, and thus achieving parallel processing effects. The worker may determine which job to execute. Additionally, it is not necessary to set specific network configurations for workers, as self-configuration can be achieved dynamically based on existing resources, with configuration items including but not limited to setting the maximum number of workers to be generated, the maximum number of times workers can be recalculated if they fail, and the default time for workers to be forcibly recycled. The present disclosure also notifies job completion in an asynchronous manner, making it particularly suitable for long-time jobs.

What is claimed is:

1. A job processing method based on a cloud service comprising:

receiving a job request and obtaining an identification string (JOB ID) of a job basing on the job request by a job scheduler;

sending the identification string to a memory cache and spawning a worker by the job scheduler;

obtaining the identification string from the memory cache and obtaining job data from a database basing on the identification string by the worker;

executing the job basing on the job data and sending a result of the job to the database by the worker;

detecting processing time of the worker for the job continuously by the job scheduler;

recycling the worker by the job scheduler in response to the processing time exceeding a specified time;

detecting whether the worker finishing the job by the job scheduler in response to the processing time does not exceeding the specified time; and recycling the worker by the job scheduler in response to the job being finished;

wherein obtaining the identification string from the memory cache by the worker comprises:

obtaining the identification string from a plurality of candidate strings by the worker;

locking the identification string by the worker via using an asynchronous lock;

writing a worker ID of the worker and the identification string to the database; and deleting the identification string from the memory cache by the worker.

2. The job processing method based on the cloud service of claim 1, wherein the step of receiving the job request by the job scheduler comprises:

receiving the job request through an event bus of the memory cache from a client device; and detecting the event bus continuously by the job scheduler, and receiving the job request by the job scheduler in response to the job request being obtained by the event bus.

3. The job processing method based on the cloud service of claim 1 further comprising:

detecting whether there being a new job request by the job scheduler in response to the job not being finished.

4. The job processing method based on the cloud service of claim 1, wherein the result comprises response data of the job and an indicator of whether the job being successfully executed; after generating the result of the job, the worker writes the result to the database, the job scheduler uses an event bus to send an execution complete signal and the identification string to a client device, and the client device reads the result of the job from the database basing on the identification string.

5. The job processing method based on the cloud service of claim 1, wherein executing the job based on the job data by the worker comprises:

writing start time of executing the job, end time of executing the job, and an indicator of whether the job is successfully executed to the database by the worker.

6. The job processing method based on the cloud service of claim 1 further comprising:

obtaining a number of existing workers before spawning the worker by the job scheduler, and starting to spawn the worker by the job scheduler in response to the number of existing workers does not exceeding a threshold.

7. The job processing method based on the cloud service of claim 1, wherein the identification string and the job data are stored by the database.

8. A job processing system based on a cloud service comprising:

a memory cache which storing an identification string associated with a job;

a database which storing the identification string associated with the job and job data associated with the job; and a job scheduler communicably connected to the database, wherein a job request is received by the job scheduler, obtain the identification string of the job according to the job request, send the identification string to the memory cache, and spawn a worker according to the job request;

wherein the worker is communicably connected to the database and the memory cache, the identification string from the memory cache is obtained by the worker, the job data from the database is obtained according to the identification string by the worker, the job is executed basing on the job data by the worker, and a result of the job to the database is sent by the worker;

wherein the memory cache stores a plurality of candidate strings; and the worker selects one of the plurality of candidate strings as the identification string, the worker is further configured to use an asynchronous lock to lock the identification string, write a worker ID and the identification string to the database, and use the asynchronous lock to delete the identification string from the memory cache after writing the identification string to the database, wherein the job scheduler further continuously detects a processing time of the worker for the job, and recycles the worker in response to the processing time exceeds a specified time, wherein in response to the processing time does not exceed the specified time, the job scheduler further detects whether the worker has finished the job and recycles the worker in response to the job is finished.

9. The job processing system based on the cloud service of claim 8, wherein the memory cache comprises an event bus, the job request from a client device is received by the event bus, the event bus is detected continuously by the job scheduler, and receiving is performed in response to the event bus having the job request.

10. The job processing system based on the cloud service of claim 8, wherein the job scheduler is further configured to detect whether there is a new job request in response to the job is not finished.

11. The job processing system based on the cloud service of claim 8, wherein the result comprises response data of the job and an indicator of whether the job is successfully executed.

12. The job processing system based on the cloud service of claim 8, wherein a start time of executing the job, and an end time of executing the job are written by the worker, and whether the job is successfully executed to the database is indicated by the worker.

13. The job processing system based on the cloud service of claim 8, wherein a number of existing workers is obtained by the job scheduler before spawning the worker, and starts to spawn the worker in response to the number of existing workers does not exceed a threshold.

* * * * *